United States Patent
Kondo et al.

(10) Patent No.: US 9,528,010 B2
(45) Date of Patent: Dec. 27, 2016

(54) SILICA COMPOSITION

(75) Inventors: Yoshihide Kondo, Tokyo (JP); Hiroaki Shirai, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 110 days.

(21) Appl. No.: 14/007,376

(22) PCT Filed: Mar. 26, 2012

(86) PCT No.: PCT/JP2012/057720
§ 371 (c)(1),
(2), (4) Date: Sep. 25, 2013

(87) PCT Pub. No.: WO2012/133287
PCT Pub. Date: Oct. 4, 2012

(65) Prior Publication Data
US 2014/0018470 A1 Jan. 16, 2014

(30) Foreign Application Priority Data

Mar. 28, 2011 (JP) ................................. 2011-070348
Mar. 28, 2011 (JP) ................................. 2011-070351

(51) Int. Cl.
C08K 9/00 (2006.01)
C09D 7/12 (2006.01)
C09C 1/30 (2006.01)
B82Y 30/00 (2011.01)
C09D 5/00 (2006.01)
C08K 3/36 (2006.01)
C08K 9/04 (2006.01)

(52) U.S. Cl.
CPC ............ C09D 7/1225 (2013.01); B82Y 30/00 (2013.01); C09C 1/3063 (2013.01); C09D 5/00 (2013.01); *C01P 2004/64* (2013.01); *C01P 2006/62* (2013.01); *C08K 3/36* (2013.01); *C08K 9/04* (2013.01); *C08L 2201/56* (2013.01)

(58) Field of Classification Search
CPC ................................ C08K 5/54; C09D 7/1225
See application file for complete search history.

(56) References Cited

U.S. PATENT DOCUMENTS

| 5,472,493 | A | 12/1995 | Regan | |
|---|---|---|---|---|
| 2004/0131786 | A1* | 7/2004 | Ma et al. | 427/385.5 |
| 2007/0266896 | A1 | 11/2007 | Suwa et al. | |
| 2010/0189993 | A1* | 7/2010 | Mori et al. | 428/317.5 |

FOREIGN PATENT DOCUMENTS

| EP | 1 247 832 | 10/2002 |
|---|---|---|
| JP | 3-103318 | 4/1991 |
| JP | 8-506611 | 7/1996 |
| JP | 2006-69870 | 3/2006 |
| JP | 2010-189477 | 9/2010 |
| WO | 94/18277 | 8/1994 |
| WO | 2005/121265 | 12/2005 |

OTHER PUBLICATIONS

Supplementary European Search Report issued Nov. 25, 2014 in European Application No. 12765776.5.
International Search Report issued May 22, 2012 in International (PCT) Application No. PCT/JP2012/057720.

* cited by examiner

*Primary Examiner* — Hannah Pak
(74) *Attorney, Agent, or Firm* — Wenderoth, Lind & Ponack, L.L.P.

(57) ABSTRACT

The purpose of the present invention is to provide an additive for a solvent-based coating material which has high coating material product stability when added to a solvent-based coating material and whereby the resulting coating film has excellent abrasion resistance. Specifically, the present invention provides a silica composition containing silica coated with a cationic surfactant represented by a specific structure, and also provides a solvent-based coating material composition comprising the silica composition.

8 Claims, No Drawings

SILICA COMPOSITION

TECHNICAL FIELD

The present invention relates to a silica composition with which, when added to a solvent-based coating material, a coating film excellent in abrasion resistance can be obtained.

BACKGROUND ART

Although a number of different kinds of coating materials are layered on one another in most cases of painting vehicles such as automobiles and electric appliances and the like, the coating material to be applied to the topmost surface of the paint surface on automobiles is required to protect the undercoating and design features such as gloss etc. However, if a product painted with such a coating material has been used for a long period of time, the coated surface may be damaged for various reasons, for example with automobiles, in cases where stones or sand contact the coated surface forming scratches called chipping, cases where the coated surface is scratched by the brushes of automatic car-washing machines, and cases where keys inadvertently contact the coated surface when locking the door. The appearance of the coated surface is deteriorated, due to such scratches. Further, the scratches may adversely affect the coated surface of the undercoatings and the like. Therefore, the coating material painted on the topmost painted surface must have abrasion resistance.

In order to impart the effect of abrasion resistance, selecting appropriate kinds of resins, blending ratios and the like is most frequently carried out. Specifically, a method of imparting abrasion resistance by hardening the coating film is known. However, once a hard coating film is scratched, problems such as cracking occur. And so, coating films having satisfactory abrasion resistance have not been obtained. On the other hand, the technical means to form a soft coating film where fine scratches can be naturally restored to the original state, due to its elasticity have been known. However, there are problems in that large scratches in the soft coating film, which cannot be restored occur easily and the soft coating film is stained easily as well.

Therefore, it has been attempted to increase the abrasion resistance of coating film by adding to a coating material an additive which increases abrasion resistance (for example, see Patent publications 1 and 2). The additive used is fine particles of silica and the like. If the fine particles are added to the coating film, the resulting coating film becomes hard and scratch-resistant. However, the level of abrasion resistance is not satisfactory and there is the problem that some of the fine particles are unstable in the coating material.

PRIOR ART REFERENCES

Patent Publications

Patent Publication 1: Japanese Patent Laid-Open No. 2010-189477
Patent Publication 2: WO 2005/121265

SUMMARY OF THE INVENTION

Problem to be Solved by the Invention

Consequently, the problem to be solved by the present invention is to provide an additive for a solvent-based coating material which, when added to the solvent-based coating material, imparts product stability to the coating material and excellent abrasion resistance to the resulting coating film.

Means for Solving the Problem

The inventors of this application keenly after intense research, found additives for solvent-based coating materials excellent in abrasion resistance to complete the present invention. Namely, the present invention relates to a silica composition comprising silica coated with a cationic surfactant represented by general formula (1) below.

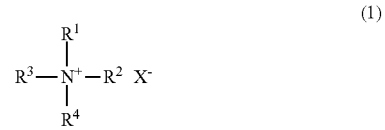

(in the formula, X represents a halogen atom or a methyl sulfuric acid derivative, $R^1$ to $R^4$ each independently represent a hydrocarbon group having 1 to 36 carbon atoms, or a hydrocarbon group having 1 to 36 carbon atoms and having at least one substituent selected from ester groups, amide groups, and hydroxyl group, or a polyether group represented by general formula (2) below, provided that at least one of $R^1$ to $R^4$ must be (i) a polyether group represented by general formula (2) below, (ii) a hydrocarbon group having 6 to 36 carbon atoms, or (iii) a hydrocarbon group having 6 to 36 carbon atoms and having at least one substituent selected from ester groups, amide groups, and hydroxyl group)

(in the formula, m represents an integer of 1 to 100 and $R^5$ represents an alkylene group having 2 to 4 carbon atoms).

Effect of the Invention

The effect of the present invention is to provide a silica composition as an additive for a solvent-based coating material which imparts product stability to a coating material and excellent abrasion resistance to the resulting coating film, when added to the coating material.

Further, if any one of $R^1$ to $R^4$ of the cationic surfactant represented by general formula (1) is a polyether group represented by general formula (2), the effect of maintaining transparency of clear coating is also exhibited.

DETAILED DESCRIPTION OF THE PREFERRED EMBODIMENTS

The silica composition of the present invention comprises granular silica coated with a cationic surfactant represented by general formula (1) below:

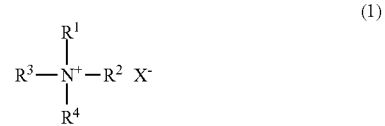

(in the formula, X represents a halogen atom or a methyl sulfuric acid derivative, $R^1$ to $R^4$ each independently represents a hydrocarbon group having 1 to 36 carbon atoms, or a hydrocarbon group having 1 to 36 carbon atoms and having at least one substituent selected from ester groups, amide groups, and hydroxyl group, or a polyether group represented by general formula (2) below, provided that at least one of $R^1$ to $R^4$ must be (i) a polyether group represented by general formula (2) below, (ii) a hydrocarbon group having 6 to 36 carbon atoms, or (iii) a hydrocarbon group having 6 to 36 carbon atoms and having at least one substituent selected from ester groups, amide groups, and hydroxyl group)

(2)

(in the formula, m represents an integer of 1 to 100 and $R^5$ represents an alkylene group having 2 to 4 carbon atoms).

$R^1$ to $R^4$ of general formula (1) represent a hydrocarbon group having 1 to 36 carbon atoms, a hydrocarbon group having 1 to 36 carbon atoms and having at least one substituent selected from ester groups, amide groups, and hydroxy group, or a polyether group represented by general formula (2).

Examples of the hydrocarbon group having 1 to 36 carbon atoms include alkyl groups such as the methyl group, ethyl group, propyl group, isopropyl group, butyl group, isobutyl group, tertiary butyl group, pentyl group, isopentyl group, neopentyl group, tertiary pentyl group, hexyl group, isohexyl group, heptyl group, isoheptyl group, octyl group, 2-ethylhexyl group, nonyl group, isononyl group, decyl group, isodecyl group, undecyl group, isoundecyl group, dodecyl group, isododecyl group, tridecyl group, isotridecyl group, tetradecyl group, isotetradecyl group, hexadecyl group, isohexadecyl group, octadecyl group, isooctadecyl group, icosyl group, docosyl group, tetracosyl group, hexacosyl group, octacosyl group, triacontyl group, 2-butyloctyl group, 2-butyldecyl group, 2-hexyloctyl group, 2-hexyldecyl group, 2-octyldecyl group, 2-hexyldodecyl group, 2-octyldodecyl group, 2-decyltetradecyl group, 2-dodecylhexadecyl group, 2-tetradecyloctadecyl group, 2-hexadecyloctadecyl group, and monomethyl-branched-isostearyl group; alkenyl groups such as the vinyl group, allyl group, propenyl group, isopropenyl group, butenyl group, isobutenyl group, pentenyl group, isopentenyl group, hexenyl group, heptenyl group, octenyl group, nonenyl group, decenyl group, undecenyl group, dodecenyl group, tetradecenyl group, hexadecenyl group, and octadecenyl group; aryl groups such as phenyl group, tolyl group, xylyl group, cumenyl group, mesityl group, benzyl group, phenethyl group, styryl group, cinnamyl group, benzhydryl group, trityl group, ethylphenyl group, propylphenyl group, butylphenyl group, pentylphenyl group, hexylphenyl group, heptylphenyl group, octylphenyl group, nonylphenyl group, decylphenyl group, undecylphenyl group, and dodecylphenyl group; and cycloalkyl groups such as cyclopentyl group, cyclohexyl group, cycloheptyl group, methylcyclopentyl group, methylcyclohexyl group, methylcycloheptyl group, cyclopentenyl group, cyclohexenyl group, cycloheptenyl group, methyl cyclopentenyl group, methyl cyclohexenyl group, and methyl cycloheptenyl group.

Examples of the hydrocarbon group having 6 to 36 carbon atoms and having at least one substituent selected from ester groups, amide groups, and hydroxyl group include hydrocarbon groups exemplified above substituted in such a manner that at least one hydrogen atom is substituted with a hydroxyl group, an ester group or an amide group is introduced into at least one carbon-carbon bond, or at least two kinds of these substituents are used for substitution. If the ester group is used, the number of carbon atoms is increased, but the hydrocarbon groups should be substituted so as to have 1 to 36 carbon atoms in total.

If the cationic surfactant of general formula (1) has an ester group, it can be obtained by esterifying a dialkylalkanolamine such as dimethylmonoethanolamine or monoalkyldialkanolamine such as monomethyl dimethanolamine with a fatty acid such as lauric acid or oleic acid and quaternizing the resulting ester with a quaternizing agent such as methyl chloride. In addition, if it contains an amide group, it can be obtained by amidating a diamine such as N,N-dimethyl-ethylenediamine with a fatty acid and then quaternizing the resulting amide with a quaternizing agent such as methyl chloride.

$R^6$ of general formula (2) represents a C2-4-alkylene group. Examples of the alkylene group include the ethylene group, propylene group, 1-methylethylene group, 2-methylethylene group, butylene group, 1-ethylethylene group, 2-ethylethylene group, 1-methylpropylene group, 2-methylpropylene group, tertiary butylene group and the like. m represents an integer of 1 to 100.

At least one of $R^1$ to $R^4$ of general formula (1) must be (i) a polyether group represented by general formula (2) below, (ii) a hydrocarbon group having 6 to 36 carbon atoms, or (iii) a hydrocarbon group having 6 to 36 carbon atoms and having at least one substituent selected from ester groups, amide groups, and hydroxyl group.

(2)

(in the formula, m represents an integer of 1 to 100 and $R^5$ represents an alkylene group having 2 to 4 carbon atoms).

In (i) above, m of general formula (2) represents an integer of 1 to 100, preferably an integer of 3 to 80, more preferably an integer of 5 to 40. If the value of m is smaller, there may be the case where the effect of the present invention is not fully exhibited, while if the value of m is larger, the ratio of the cationic group in the molecule is lowered, and thus the amount of the additive should be increased. If the value of m is more than 100, the amount of additive is too large, which results in deterioration of the physical properties of the coating film. $R^5$ represents an alkylene group having 2 to 4 carbon atoms and includes those exemplified above. $R^5$ may be the same group for providing a homopolymer or may be different groups for providing a block copolymer or random copolymer.

As the hydrocarbon group having 6 to 36 carbon atoms in (ii) above, those exemplified above and having 6 to 36 carbon atoms are exemplified. Among them, it is preferably an aliphatic hydrocarbon group having 8 to 18 carbon atoms, more preferably that having 10 to 18 carbon atoms. If the number of carbon atoms is less than 6, there may be a case where the scratch resistance and transparency of the coating film deteriorates. If the number of carbon atoms is more than 36, there may be a case where the solubility in water is reduced and adsorption reaction onto silica does not proceed.

As the hydrocarbon group having 6 to 36 carbon atoms and having at least one substituent selected from ester groups, amide groups, and hydroxyl group, those exemplified above having at least one substituent selected from ester groups, amide groups, and hydroxyl group and having 6 to 36 carbon atoms are exemplified. Among them, it is preferably an aliphatic hydrocarbon group having at least one substituent selected from ester groups, amide groups, and hydroxyl group and having 8 to 18 carbon atoms, more preferably that having at least one substituent selected from ester groups, amide groups and hydroxyl group and having 10 to 16 carbon atoms.

The structure of general formula (1) should contain at least one of the groups described in (i) to (iii) above, preferably one to three of the groups, more preferably one or two groups, and most preferably at least one of the groups described in (i) from the point of transparency of coating film. If only the groups described in (ii) or (iii) are present in the structure of general formula (1), preferably at least two groups either in (ii) or (ii) are present. In addition, groups other than those described in (i) to (iii) are preferably alkyl groups having 1 to 4 carbon atoms, more preferably a methyl group and ethyl group.

$X^-$ in general formula (1) is a counter ion and represents a halogen atom or a methyl sulfuric acid derivative. If $X^-$ represents a methyl sulfuric acid derivative, the structure thereof is as shown by general formula (3) below:

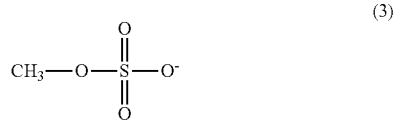

(3)

Examples of the halogen atom include fluorine atoms, chlorine atoms, bromine atoms, iodine atoms and the like.

Among them, it is preferably halogen atoms, more preferably chlorine atoms and bromine atoms, further more preferably chlorine atoms because the cationic surfactant can be produced easily in a cost-effective manner.

The silica that can be used in the present invention may be of any kind as long as they are in granular form. In addition, other metal oxides such as aluminum oxide and titanium oxide may be contained in silica as long as the amounts thereof are small. The amount of metal oxide, if contained, is preferably 50 mol % or less, more preferably 20 mol % or less, even more preferably 5 mol % or less, based on the amount of silica. Further, the granular silica should preferably have a particle size of 300 nm or less and is preferably aqueous colloidal silica. The particle size thereof can be determined using a particle size distribution measuring device such as a particle size distribution meter of dynamic light scattering system.

In general, the aqueous colloidal silica in the form of an aqueous solution having a solid content of 10 to 50 percent by weight is manufactured as a product. It is manufactured as an aqueous solution using a silicate, tetraalkoxysilanes or the like, but the kind of material used is not particularly limited. The particle size of colloidal silica is not particularly limited. However, it is preferably 1 to 200 nm, more preferably 3 to 100 nm, and furthermore preferably 5 to 50 nm. Colloidal silica having excellent product stability is more preferable. Specifically, colloidal silica that does not turn into gel after it has stood in the atmosphere at 40° C. for one month can be used as colloidal silica having excellent product stability. There are several types of colloidal silica dispersed in a solvent. However, in general, they are modified colloidal silica that have been subjected to alkylation modification with a modifier, which cannot be used in the present invention.

The silica composition of the present invention is coated with a cationic surfactant represented by general formula (1). An example of a coating method comprises mixing colloidal silica with the cationic surfactant and then reacting the mixture under heat for the predetermined period of time. Reaction under heat forms a strong protective film of the cationic surfactant on the surface of colloidal silica.

The amount of the cationic surfactant blended is not particularly limited, but the amount to 100 parts by weight of silica (on a silica solid weight basis in the case of colloidal silica) is preferably 5 to 600 parts by weight, more preferably 10 to 300 parts by weight, further more preferably 20 to 200 parts by weight. If it is less than 5 parts by weight, there may be a case where dispersion properties in the coating material becomes poor or scratch resistance becomes insufficient. If it is more than 600 parts by weight, there may be a case where the effect corresponding to the added amount cannot be obtained or physical properties of the obtained coating film are adversely affected, when added to the coating material.

The silica composition of the present invention may be in powder form free of solvents, but is preferably dispersed in an organic solvent because the composition in powder form has the problem that particles therein bond to each other during long periods of storage and powders turn into a solid. Any kind of organic solvents can be used as long as they are liquid at room temperature. Examples of such organic solvents include alcohol solvents such as methanol, ethanol, propanol, isopropanol, and butanol; ester solvents such as methyl acetate, ethyl acetate, butyl acetate, isobutyl acetate, polyalkylene glycol monoacetate, polyalkylene glycol diacetate, and propylene glycol monomethyl ether acetate; ketone solvents such as acetone, butanone, diethyl ketone, methyl ethyl ketone, methyl isobutyl ketone, and diisobutyl ketone; halogenated hydrocarbon solvents such as dichloromethane, chloroform, carbon tetrachloride, and dichloroethane; and hydrocarbon solvents such as hexane, benzene, toluene, xylene, and petroleum ether. Among them, ester solvents, ketone solvents, halogenated hydrocarbon solvents, and hydrocarbon solvents which can be separated from water are preferable because they can be easily produced and ester solvents, ketone solvents, and hydrocarbon solvents are more preferable because they are safer. The reasons why the use of a solvent which can be separated from water is preferable will be explained in detail in the description of the production process below.

When the silica composition of the present invention is dispersed in the organic solvent, it is added such that the content thereof to the total amount of the composition is preferably 5 to 50 percent by weight, more preferably 10 to 40 percent by weight. If it is less than 5 percent by weight, there may be a case where a large amount of organic solvent is blended in the coating material, which results in adverse effects on the physical properties of the coating material. If it is more than 50 percent by weight, there may be a case where the stability of the silica composition of the present invention in the organic solvent becomes poor.

An example of a specific production process of the silica composition of the present invention comprises dropping an aqueous colloidal silica solution to a system in which the organic solvent and the cationic surfactant are present at 40 to 100° C. and stirring the mixture at the same temperature for 1 to 10 hours to conduct a coating reaction. Water present in the system is preferably removed during the reaction or after completion of the reaction and the resulting product is more preferably dispersed in the organic solvent while water is being removed. An example of a method for removing water and dispersing in the organic solvent may comprise cooling the organic solvent and water azetropically distilled upon mixing and introducing the mixture into a separation funnel, separating the organic solvent from water in the separation funnel, removing only water, and returning the organic solvent into the system. Most of the water can be removed by this method. However, the organic solvent used should have the property to be separated from water for achieving complete removal. If an organic solvent compatible with water is used, the step of adding the organic solvent after removing the predetermined amount of water and organic solvent is repeated until the water content becomes less than or equal to the predetermined value of interest. The silica composition of the present invention dispersed in the organic solvent can be obtained by optionally aging the resulting material at 100 to 150° C. for about 30 min to 3 hours after the reaction above and water removal. In the case of obtaining the silica composition of the present invention in powder form, all of the organic solvent is removed from the silica composition of the present invention dispersed in the organic solvent by distillation under reduced pressure or the like or all of water, the organic solvent, or the mixture solvent thereof may be removed after completion of the reaction.

The solvent-based coating composition of the present invention can be obtained by adding the silica composition of the present invention obtained as above to a solvent-based coating material and mixing the same until the resulting mixture becomes homogeneous. The organic solvent may be blended in the solvent-based coating material upon addition. However, if a large amount of organic solvent is present in the coating material, the physical properties of the coating material are adversely affected and thus the concentration of the silica composition of the present invention in the organic solvent is preferably adjusted to the predetermined value as described above. Solvent-based coating materials well known in the art may be used as the solvent-based coating material. Examples thereof include (meth)acrylic resins, polyester resins, alkyd resins, urethane resins, epoxy resins, melamine resins, and a mixture thereof. Among them, solvent-based coating materials comprising a (meth)acrylic resin are preferable because the effect of scratch resistance can be easily obtained.

Examples of monomers constituting the (meth)acrylic resins include $C_1$-$C_{18}$ alkyl(meth)acrylates such as methyl (meth)acrylate, ethyl(meth)acrylate, propyl(meth)acrylate, butyl(meth)acrylate, hexyl(meth)acrylate, octyl(meth)acrylate, lauryl(meth)acrylate, and cyclohexyl(meth)acrylate and hydroxyl group-containing (meth)acrylates such as hydroxyethyl(meth)acrylate, hydroxypropyl(meth)acrylate, hydroxybutyl(meth)acrylate, (poly)ethylene glycol mono (meth)acrylate, and (poly)propylene glycol mono(meth) acrylate. Among the monomers above, hydroxyl group-containing (meth)acrylates capable of copolymerizing with other monomers are preferable.

The molecular weight of the resin obtained by polymerizing these monomers is not limited. However, the weight-average molecular weights of (meth)acrylic homopolymers and copolymers with other monomers are preferably 500 to 100000, more preferably 1000 to 50000, even more preferably 2000 to 30000. Examples of the copolymers with other monomers include (meth)acrylic urethane resins, (meth) acrylic polyester resins, (meth)acrylic melamine resins and the like. However, (meth)acrylic urethane resins prepared using a (meth)acrylic resin as a main component and an urethane curing agent as a curing agent are preferable.

The amount of the silica composition of the present invention added is not limited, but the amount to the resin component in the solvent-based coating material is preferably 0.1 to 30 percent by weight, more preferably 0.5 to 10 percent by weight. If it is less than 0.1 percent by weight, there may be cases where the effect of scratch resistance cannot be obtained. If it is more than 30 percent by weight, there may be cases where the stability of the solvent-based coating composition becomes poor.

Use of the solvent-based coating composition of the present invention is not limited and the composition may be applied to any uses where the solvent-based coating material can be used. However, as it has excellent scratch resistance, it is preferably applied to a use where it is coated on the topmost surface of an article to be coated. Examples of use include coating materials for construction and building materials, electric appliances, and automobiles. Among them, it is preferably used in coating materials for electric appliances (topcoat) and automobiles (topcoat). Further, if the cationic surfactant of general formula (1) contains a polyether group represented by general formula (2), it is preferably used in an automotive clear coat in which the transparency is particularly important because the transparency of the coating material is not reduced.

EXAMPLES

The present invention will be explained in detail with reference to the examples below.

Production of Silica Coated with the Cationic Surfactant: Production of Sample 1

Into a 1000 ml four-neck flask equipped with a separation funnel with a cooler, a thermometer, a dropping funnel, and a stirrer were put 36 g of the cationic surfactant of Sample 1 listed in Table 1 and 245 g of methyl isobutyl ketone (MIBK) as an organic solvent, the mixture was heated to 96° C. with stirring, and then 360 g of colloidal silica (ADELITE AT-20Q) (having a silica solid content of 20 percent by weight); manufactured by ADEKA CORPORATION) in the dropping funnel was dropped over eight hours. The temperature in the system was maintained at 95 to 98° C. during the dropping of the colloidal silica for achieving the azeotropic state of MIBK and water. A process of intermittently collecting the distillated MIBK and water through the cooler, removing water by liquid separation, and collecting and returning only MIBK into the system was repeated in such a manner that the water content in the system during the reaction was maintained at 2 to 4 percent by weight.

The average particle size of colloidal silica (ADELITE AT-20Q) was 20 nm. The particle size thereof was determined by a particle size distribution meter of a dynamic optical scattering system (LB-550; manufactured by HORIBA, Ltd.) using a solution prepared by adding 10 g of pure water to 5 g of colloidal silica.

After the dropping step, the temperature in the system was raised to 130° C. for aging while the azeotropic state was maintained to remove water from the system. After the aging and water removal process was conducted for one hour, the system was cooled and the material in the system was filtered with a paper filter to obtain a dispersion of colloidal silica coated with the cationic surfactant (Sample 1). Example 1 was liquid and had a solid content of 30 percent by weight and water content of 0.1 percent.

The silica dispersion of Sample 12 was prepared by the same production process as that for Sample 1 except that lauryl trimethyl ammonium was used as the cationic surfactant.

Samples 2-32

Colloidal silica dispersions of Samples 2 to 28 were produced by the same production method as that for Sample 1 using a different kind of cationic surfactant and organic solvent or using a different kind of surfactant. The structures of cationic surfactants and the like and the kinds of organic solvents used are described in Tables 1 and 2. The average particle size of each sample was 20 nm (determined by the same method as above).

Samples 1 to 20 in Table 1 were products of the present invention and Comparative samples 21 to 32 are comparative products. Comparative example 31 below used non-modified colloidal silica. Comparative example 32 was subjected to testing using only a coating material.

Sample 29

Into a 1000 ml four-neck flask equipped with a separation funnel with a cooler, a thermometer, a dropping funnel, and a stirrer were put 180 g of colloidal silica (ADELITE AT-20Q) (having a silica solid content of 20 percent by weight; manufactured by ADEKA CORPORATION), 180 g of isopropanol, and 1.5 g of 25 percent by weight ammonium water and were mixed and 18 g of dimethyldimethoxysilane was slowly added over 30 min. After completion of the adding step, the resulting mixture was reacted under heat at 70 to 75° C. for six hours and was cooled to room temperature after completion of the reaction. After that, 540 g of butyl acetate was added, the pressure was reduced to the level where water and isopropanol were distilled at 30 to 40° C. and distillation was carried out until the water content became 0.5 percent by weight or less to obtain dimethyl modified colloidal silica (Sample 29) dispersed in butyl acetate. Sample 29 had a solid content of 30.2 percent by weight and a water content of 0.2 percent by weight.

Sample 30

The same equipment was used as that for Sample 29 and the reaction was carried out in the same manner except that 18 g of trimethylmethoxysilane was used in place of 18 g of dimethyldimethoxysilane and 540 g of MIBK was used in place of 540 g of butyl acetate to obtain trimethyl modified colloidal silica dispersed in MIBK. Sample 30 had a solid content of 30.1 percent by weight and a water content of 0.1 percent by weight. Regarding the method for removing water, water was removed by liquid separation in the same manner as for Sample 1.

Sample 31

ADELITE AT-20Q

TABLE 1

| | | $R^1$ | $R^2$ | $R^3$ | $R^4$ | Organic solvent |
|---|---|---|---|---|---|---|
| Samples | 1 | Polyoxyethylene (10EO) | Ethyl | Ethyl | Methyl | MIBK |
| | 2 | Polyoxypropylene (10PO) | Ethyl | Ethyl | Methyl | MIBK |
| | 3 | Polyoxybutylene (5BO) | Ethyl | Ethyl | Methyl | Butyl acetate |
| | 4 | Polyoxypropylene (20PO) | Ethyl | Ethyl | Methyl | MIBK |
| | 5 | Polyoxypropylene (10PO) | Polyoxypropylene (10PO) | Methyl | Methyl | MIBK |
| | 6 | Polyoxypropylene (10PO) | Polyoxypropylene (10PO) | Polyoxypropylene (10PO) | Methyl | MIBK |
| | 7 | Polyoxypropylene (10PO) | Hydroxyethyl | Methyl | Methyl | MIBK |
| | 8 | Polyoxypropylene (10PO) | Polyoxypropylene (10PO) | Octyl | Methyl | MIBK |
| | 9 | Dodecyl | Polyoxypropylene (10PO) | Polyoxypropylene (10PO) | Methyl | MIBK |
| | 10 | Hydroxypropyl | Ethyl | Ethyl | Methyl | MIBK |
| | 11 | Polyoxypropylene (3PO) | Ethyl | Ethyl | Methyl | MIBK |
| | 12 | Dodecyl | Methyl | Methyl | Methyl | MIBK |
| | 13 | Decyl | Methyl | Methyl | Methyl | MIBK |
| | 14 | Tetradecyl | Methyl | Methyl | Methyl | MIBK |
| | 15 | Octadecyl | Methyl | Methyl | Methyl | MIBK |
| | 16 | Oleyl | Methyl | Methyl | Methyl | MIBK |
| | 17 | Octadecyl | Octadecyl | Methyl | Methyl | MIBK |
| | 18 | Dodecyl | Hydroxyethyl | Hydroxyethyl | Methyl | Butyl acetate |
| | 19 | Ester-containing group | Hydroxyethyl | Hydroxyethyl | Methyl | MIBK |
| | 20 | Amide-containing group | Methyl | Methyl | Methyl | Butyl acetate |

TABLE 2

| | | $R^1$ | $R^2$ | $R^3$ | $R^4$ | Organic solvent |
|---|---|---|---|---|---|---|
| Samples | 21 | Methyl | Methyl | Methyl | Methyl | MIBK |
| | 22 | Ethyl | Ethyl | Ethyl | Ethyl | Butyl acetate |

TABLE 2-continued

| | $R^1$ | $R^2$ | $R^3$ | $R^4$ | Organic solvent |
|---|---|---|---|---|---|
| 23 | Butyl | Butyl | Butyl | Butyl | Butyl acetate |
| 24 | Polyoxyethylene(3EO)lauryl ether phosphate | | | | MIBK |
| 25 | Polyoxyethylene(3EO)lauryl ether sulfate Na salt | | | | MIBK |
| 26 | Polyoxyethylene(12EO)lauryl alcohol | | | | MIBK |
| 27 | Pluronic surfactant (ADEKA pluronic L-62: manufactured by ADEKA CORPORATION) | | | | MIBK |
| 28 | Polyoxyethylene(10PO)diethylamine | | | | MIBK |

All the counter ions are chlorine ions (X is Cl in general formula (1)).
Polyoxyethylene (10EO): $R^5$ is ethylene group and m is 10 in general formula (2).
Polyoxypropylene (10PO): $R^5$ is propylene group and m is 10 in general formula (2).
Polyoxybutylene (5BO): $R^5$ is butylene group and m is 5 in general formula (2).
Polyoxypropylene (20PO): $R^5$ is propylene group and m is 20 in general formula (2).
Ester-containing group: $C_{11}H_{23}COOCH_2CH_2$—
Amide-containing group: $C_{11}H_{23}CONHCH_2CH_2$—
Samples 24 and 25 were anionic surfactants
Samples 26 and 27 were nonionic surfactants
Sample 28 was a tertiary amine compound
MIBK: methyl isobutyl ketone <Preparation of Plates for Testing Scratch Resistance>

To the resin component of the solvent-based coating material of acrylic resin described below was added 5 percent by weight of the sample above and was mixed to a homogeneous state to prepare a test coating material. The state of this test coating material was observed one hour after the mixing step. It was coated on a black base electrodeposition coating plate such that the resulting film had a thickness of 10 mil using an applicator. The film was aged at room temperature for 10 min, was baked at 70° C. for one hour, and was further aged for one day, and then the scratch resistance testing was carried out. The states of the tested coating materials were evaluated as below.
(Acrylic-urethane curable solvent-based coating material)
SUPER DIAMOND CLEAR BASE (acrylic main agent; manufactured by KANSAI PAINT CO., LTD.): 100 parts
SUPER DIAMOND CLEAR curing agent (urethane-based curing agent; manufactured by KANSAI PAINT CO., LTD.): 50 parts
RETAN PG2K thinner (manufactured by KANSAI PAINT CO., LTD.): 10 parts
(Evaluation by Observation)
◯: Homogenous and transparent
X: Nonhomogeneous state with precipitation, floating, turbidity, or the like
<Scratch Resistance Testing>

Steel wool was attached to the operating part of a variable load type friction and wear tester (HHS-2000; manufactured by HEIDON CORPORATION), the steel wool was rubbed back and forth across the surface of the testing plates, and L values (lightness) before and after testing were determined using a colorimeter (CM-3700d: manufactured by KONICA MINOLTA, INC.) to calculate a difference in L values (ΔL). The plates before testing appeared black through the transparent coating film. However, if the coating film was scratched, the coating film appeared white, which resulted in the difference of L values. The smaller the difference in L values of a coating film, the more the coating film can be evaluated as having excellent scratch resistance. The L value before testing was 6.15. The results are shown in Table 3.
(Testing Conditions)
Load: 1000 g
Speed: 10 mm/sec
Reciprocating motion width: 40 mm
Reciprocation number: 10 times

TABLE 3

| | Sample | L value | ΔL value | Evaluation by visual observation |
|---|---|---|---|---|
| Examples 1 | 1 | 8.40 | 2.25 | ◯ |
| 2 | 2 | 8.17 | 2.02 | ◯ |
| 3 | 3 | 8.27 | 2.12 | ◯ |
| 4 | 4 | 8.20 | 2.05 | ◯ |
| 5 | 5 | 8.37 | 2.22 | ◯ |
| 6 | 6 | 8.50 | 2.35 | ◯ |
| 7 | 7 | 8.42 | 2.27 | ◯ |
| 8 | 8 | 8.51 | 2.36 | ◯ |
| 9 | 9 | 8.27 | 2.12 | ◯ |
| 10 | 10 | 8.70 | 2.55 | ◯ |
| 11 | 11 | 8.63 | 2.48 | ◯ |
| 12 | 12 | 8.50 | 2.36 | ◯ |
| 13 | 13 | 8.20 | 2.05 | ◯ |
| 14 | 14 | 8.57 | 2.42 | ◯ |
| 15 | 15 | 8.88 | 2.73 | ◯ |
| 16 | 16 | 8.47 | 2.32 | ◯ |
| 17 | 17 | 8.49 | 2.34 | ◯ |
| 18 | 18 | 8.53 | 2.38 | ◯ |
| 19 | 19 | 8.23 | 2.08 | ◯ |
| 20 | 20 | 8.31 | 2.16 | ◯ |
| Comparative examples 1 | 21 | 11.78 | 5.63 | x |
| 2 | 22 | 11.69 | 5.54 | x |
| 3 | 23 | 11.60 | 5.45 | x |
| 4 | 24 | 11.78 | 5.63 | x |
| 5 | 25 | 11.88 | 5.73 | x |
| 6 | 26 | 11.27 | 5.12 | x |
| 7 | 27 | 11.37 | 5.22 | x |
| 8 | 28 | 11.29 | 5.14 | x |
| 9 | 29 | 10.27 | 4.12 | ◯ |
| 10 | 30 | 11.01 | 4.86 | ◯ |
| 11 | 31 | 11.34 | 5.19 | x |
| 12 | 32 | 12.43 | 6.28 | — |

The L value before testing: 6.15

Comparative example 11 was prepared by adding 5 percent by weight of ADELITE AT-20Q alone or Sample 31 to the coating material.

No additive was added to the coating material in Comparative example 12.

The inventors of this application found that when the cationic surfactant represented by general formula (1) contains a polyether group represented by general formula (2), the silica composition comprising the cationic surfactant does not reduce the transparency of the coating material. Experimental results showing this are described below.
<Preparation of Plates for Testing Transparency>

To the resin component of two-liquid type curable urethane solvent-based coating material used for preparation of plates for testing scratch resistance was added 5 percent by weight of the sample described above and was mixed until they became homogeneous to obtain a testing coating material. The testing coating material was coated on a transparent colorless glass plate using an applicator such that the resulting film had a thickness of 20 mil, the film was aged for 10 min at room temperature, and then was baked at 70° C. for one hour. The transparency of the coating film was determined after further aging for one day.
<Transparency Testing>

The turbidity of coating film prepared by applying the coating film for testing on a glass plate by HAZE MATER-NDH-2000 (manufactured by NIPPON DENSHOKU INDUSTRIES, CO., LTD.) was determined. The less turbidity value a coating film had, the more almost transparent and less turbid it appeared. If the turbidity value is 0.5 or less, the film appeared almost transparent. If it is more than 0.5, turbidity could be confirmed visually. If it is more than 1.0, turbidity could be clearly confirmed.

The results are shown in Table 4. As is clear from the results, it was found that if the cationic surfactant represented by general formula (1) contains a polyether group represented by general formula (2), it does not reduce the transparency of the coating film.

TABLE 4

| Sample | Results of transparency testing |
|---|---|
| 1 | 0.47 |
| 2 | 0.45 |
| 3 | 0.46 |
| 4 | 0.44 |
| 5 | 0.38 |
| 6 | 0.41 |
| 7 | 0.43 |
| 8 | 0.40 |
| 9 | 0.38 |
| 10 | 0.61 |
| 11 | 0.53 |
| 12 | 1.06 |
| 17 | 1.02 |
| 22 | 2.41 |
| 28 | 1.23 |
| 29 | 1.88 |
| 30 | 0.96 |
| 31 | 2.56 |
| — | 0.23 |

The invention claimed is:

1. A solvent-based coating composition comprising an additive and a coating resin, wherein the additive consists of a silica composition consisting of colloidal silica coated with a cationic surfactant represented by formula (1) below dispersed in an organic solvent selected from the group consisting of ester solvents, ketone solvents, hydrocarbon solvents and a mixture thereof,

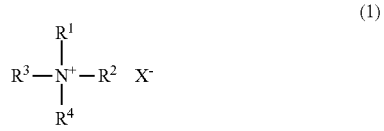

(1)

wherein X represents a halogen atom or a methyl sulfuric acid derivative, $R^1$ to $R^4$ each independently represent a hydrocarbon group having 1 to 36 carbon atoms, or a hydrocarbon group having 1 to 36 carbon atoms and having at least one substituent selected from ester groups, amide groups, and hydroxyl group, or a polyether group represented by formula (2) below, provided that at least one of $R^1$ to $R^4$ must be (i) a polyether group represented by formula (2) below, (ii) a hydrocarbon group having 6 to 36 carbon atoms, or (iii) a hydrocarbon group having 6 to 36 carbon atoms and having at least one substituent selected from the group consisting of ester groups, amide groups, and hydroxyl group,

(2)

wherein m represents an integer of 1 to 100 and $R^5$ represents an alkylene group having 2 to 4 carbon atoms, and wherein an amount of the silica composition to the coating resin is 0.5 to 10 percent by weight.

2. The solvent-based coating composition according to claim 1, wherein the silica-coating cationic surfactant accounts for 5 to 600 parts by weight, based on 100 parts by weight of the colloidal silica.

3. The solvent-based coating composition according to claim 1, wherein a particle size of the colloidal silica is from 1 to 200 nm.

4. The solvent-based coating composition according to claim 1, wherein the coating resin is a resin comprising a (meth)acrylic polymer.

5. The solvent-based coating composition according to claim 2, wherein a particle size of the colloidal silica is from 1 to 200 nm.

6. The solvent-based coating composition according to claim 2, wherein the coating resin is a resin comprising a (meth)acrylic polymer.

7. The solvent-based coating composition according to claim 1, wherein the coating resin is at least one resin selected form the group consisting of (meth)acrylic resins, polyester resins, alkyd resins, urethane resins, epoxy resins, melamine resins, and a mixture thereof.

8. The solvent-based coating composition according to claim 2, wherein the coating resin is at least one resin selected from the group consisting of (meth)acrylic resins, polyester resins, alkyd resins, urethane resins, epoxy resins, melamine resins, and a mixture thereof.

* * * * *